United States Patent
Quinn et al.

(10) Patent No.: US 11,657,226 B2
(45) Date of Patent: May 23, 2023

(54) DETECTING AND MITIGATING BIAS IN NATURAL LANGUAGE PROCESSING

(71) Applicant: INTERNATIONAL BUSINESS MACHINES CORPORATION, Armonk, NY (US)

(72) Inventors: Carla Quinn, Markham (CA); Keith Goode, Round Rock, TX (US); Mayo Takeuchi, Vienna (AT); John Handy Bosma, Leander, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 302 days.

(21) Appl. No.: 17/121,789

(22) Filed: Dec. 15, 2020

(65) Prior Publication Data
US 2022/0188518 A1 Jun. 16, 2022

(51) Int. Cl.
*G06F 17/00* (2019.01)
*G06F 40/289* (2020.01)
*G06F 40/30* (2020.01)
*G06F 16/22* (2019.01)

(52) U.S. Cl.
CPC ........ *G06F 40/289* (2020.01); *G06F 16/2272* (2019.01); *G06F 16/2291* (2019.01); *G06F 40/30* (2020.01)

(58) Field of Classification Search
None
See application file for complete search history.

(56) References Cited

U.S. PATENT DOCUMENTS

| | | | |
|---|---|---|---|
| 10,169,802 B2 * | 1/2019 | Kalikivayi | ......... G06Q 30/0629 |
| 10,304,000 B2 | 5/2019 | Birnbaum | |
| 10,325,272 B2 | 6/2019 | Hunt | |
| 2019/0317994 A1 * | 10/2019 | Singh | ...................... G06F 40/30 |

OTHER PUBLICATIONS

Bender et al.; "Data Statements for Natural Language Processing: Toward Mitigating System Bias and Enabling Better Science," Transactions of the Association for Computational Linguistics, vol. 6, pp. 587-604, 2018.

(Continued)

*Primary Examiner* — Satwant K Singh
(74) *Attorney, Agent, or Firm* — Robert R. Aragona

(57) ABSTRACT

An embodiment for detecting and mitigating bias is provided. The embodiment may include receiving real-world data from a database. The embodiment may also include creating an inverted index from the real-world data. The embodiment may further include analyzing words in the inverted index. The analyzation may identify a plurality of categories in the real-world data. The embodiment may also include generating a structure template containing various entities within each category of the plurality of categories. The embodiment may further include receiving a test record of the structure template. The embodiment may also include providing alternative entities in the test record where bias is likely to occur. The embodiment may further include storing the test record. The embodiment may also include in response to determining bias exists, indicating a corrective action.

17 Claims, 6 Drawing Sheets

(56) References Cited

OTHER PUBLICATIONS

Daugherty et al., "Using Artificial Intelligence to Promote Diversity," MIT Sloan Management Review, Nov. 21, 2018, [accessed May 1, 2020], Retrieved from the Internet: <https://sloanreview.mit.edu/article/using-artificial-intelligence-to-promote-diversity/>, 5 pages.

Disclosed Anonymously, "Content Variety Presentation Enhancement," IP.com No. IPCOM000258259D, IP.com Publication Date: Apr. 23, 2019, 4 pages.

Disclosed Anonymously, "System and Method for Medical Cognitive Bias Analysis," IP.com No. IPCOM000254978D, IP.com Publication Date: Aug. 17, 2018, 4 pages.

Disclosed Anonymously, "System Method and Apparatus for Optimizing Black-Box Testing via Natural Language Descriptions of the Target System With Applications in Security Testing," IP.com No. IPCOM000239542D, IP.com Publication Date: Nov. 14, 2014, 4 pages.

Dixon et al., "Measuring and Mitigating Unintended Bias in Text Classification," AIES'18, Feb. 2-3, 2018, https://doi.org/10.1145/3278721.3278729, pp. 67-73.

Mell et al., "The NIST Definition of Cloud Computing", National Institute of Standards and Technology, Special Publication 800-145, Sep. 2011, 7 pages.

Recasens et al.. "Linguistic Models for Analyzing and Detecting Biased Language," Proceedings of the 51st Annual Meeting of the Association for Computational Linguistics, Aug. 4-9, 2013, pp. 1650-1659.

\* cited by examiner

DETECTING AND MITIGATING BIAS IN NATURAL LANGUAGE PROCESSING

BACKGROUND

The present invention relates generally to the field of computing, and more particularly to a system for detecting and mitigating bias from automated systems and formalized processes centered on natural language processing (NLP).

Bias in the modern world exists in many forms. Bias may be explicit or, more commonly, implicit. Globalization over the past few decades has brought people from different parts of the world together where they live and work in the same community. To promote diversity and inclusion, many organizations, such as businesses and universities, go through great lengths to remove bias from decision-making and selection processes. Examples may include reviewing resumes, assessing skills of a prospective employee, automated interviews, as well as automated grading of applications and assignments. Embodiments of the present invention improve upon progress in detecting bias and preventing such bias before it occurs.

SUMMARY

According to one embodiment, a method, computer system, and computer program product for detecting and mitigating bias is provided. The embodiment may include receiving real-world data from a database. The embodiment may also include creating an inverted index from the real-world data. The embodiment may further include analyzing words in the inverted index. The analyzation may identify a plurality of categories in the real-world data. The embodiment may also include generating a structure template containing various entities within each category of the plurality of categories. The embodiment may further include receiving a test record of the structure template. The embodiment may also include providing alternative entities in the test record where bias is likely to occur. The embodiment may further include storing the test record. The embodiment may also include in response to determining bias exists, indicating a corrective action. The embodiment may further include providing an audit trail of the test record.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
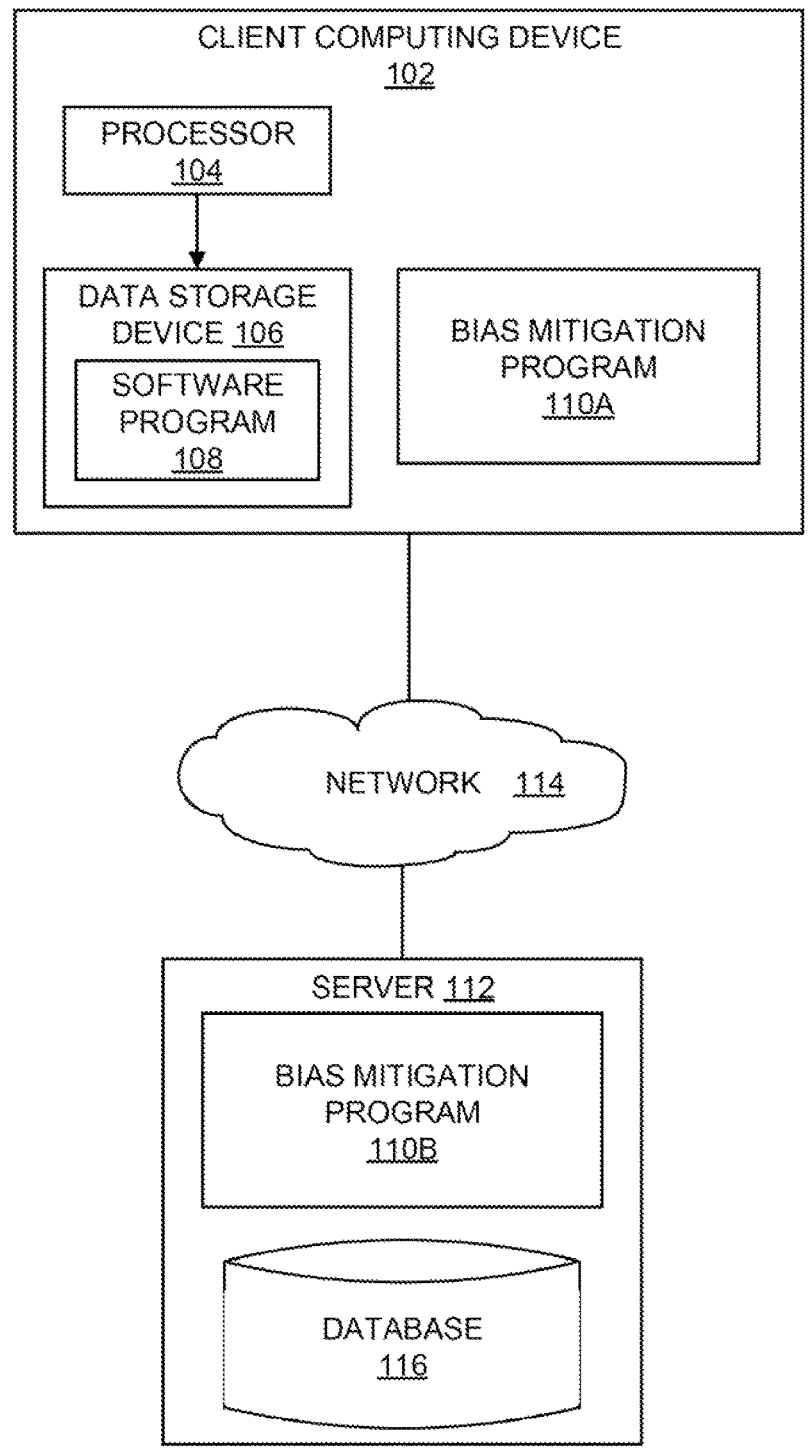
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to a system for detecting and mitigating bias from automated systems and formalized processes centered on natural language processing (NLP). The following described exemplary embodiments provide a system, method, and program product to, among other things, derive variations in data and, accordingly, determine whether bias exists in automated systems or formalized processes. Therefore, the present embodiment has the capacity to improve the technical field of bias detection and mitigation by proactively and more accurately testing for bias and validating fairness in these automated systems or formalized processes.

As previously described, bias in the modern world exists in many forms. Bias may be explicit or, more commonly, implicit. Globalization over the past few decades has brought people from different parts of the world together where they live and work in the same community. To promote diversity and inclusion, many organizations, such as businesses and universities, go through great lengths to remove bias from decision-making and selection processes. Examples may include reviewing resumes, assessing skills of a prospective employee, automated interviews, as well as automated grading of applications and assignments. Embodiments of the present invention improve upon progress in detecting bias and preventing such bias before it occurs. Although there has been some progress in detecting and addressing bias in automated systems or formalized processes, there is a lack of testing methods and technical platforms to test for bias proactively, such that persons who are required to use these automated systems and formalized processes are not subjected to bias. There is also an assumption that bias that is not explicit does not exist. This problem is typically addressed by utilizing statistical tests for fairness using live data. However, there may be insufficient naturally-occurring live data across dimensions in which bias may occur, and statistical tests require human beings to posit potential bias along particular parameters, although human beings may not even be aware that bias may exist. It may therefore be imperative to have a system in place to detect and mitigate explicit and implicit bias in these automated systems or formalized processes before such bias occurs. Thus, embodiments of the present invention may provide advantages including, but not limited to, building trust in automated systems or formalized processes where bias may be present, promoting social norms such as equity, fairness, and trust, and minimizing harm that could be caused by bias against real world subjects of these automated systems and formalized processes.

According to at least one embodiment, the system may receive real-world data from a database. The system may then create an inverted index from the real-world data. Upon creating the inverted index, the system may analyze words in the inverted index. The analyzation may identify a plurality of categories in the real-world data. The system may then generate a structure template which contains various entities within each category of the plurality of categories. The system may receive a test record of the structure template and provide alternative entities in the test record where bias is likely to occur. The system may then store the test record. In response to determining bias exists, the system may indicate a corrective action to prevent bias from occurring again. The system may provide an audit trail of the test record to provide evidence of bias detection and mitigation efforts.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to derive variations in data and, accordingly, determine whether bias exists in automated systems or formalized processes.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a bias mitigation program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running a bias mitigation program 110B and a database 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the bias mitigation program 110A, 110B may be a program capable of building trust in automated systems or formalized processes where bias may be present, promoting social norms such as equity, fairness, and trust, and minimizing harm that could be caused by bias against real world subjects of these automated systems and formalized processes. The bias detection and mitigation method is explained in further detail below with respect to FIGS. 2A and 2B.

Figure 2A:
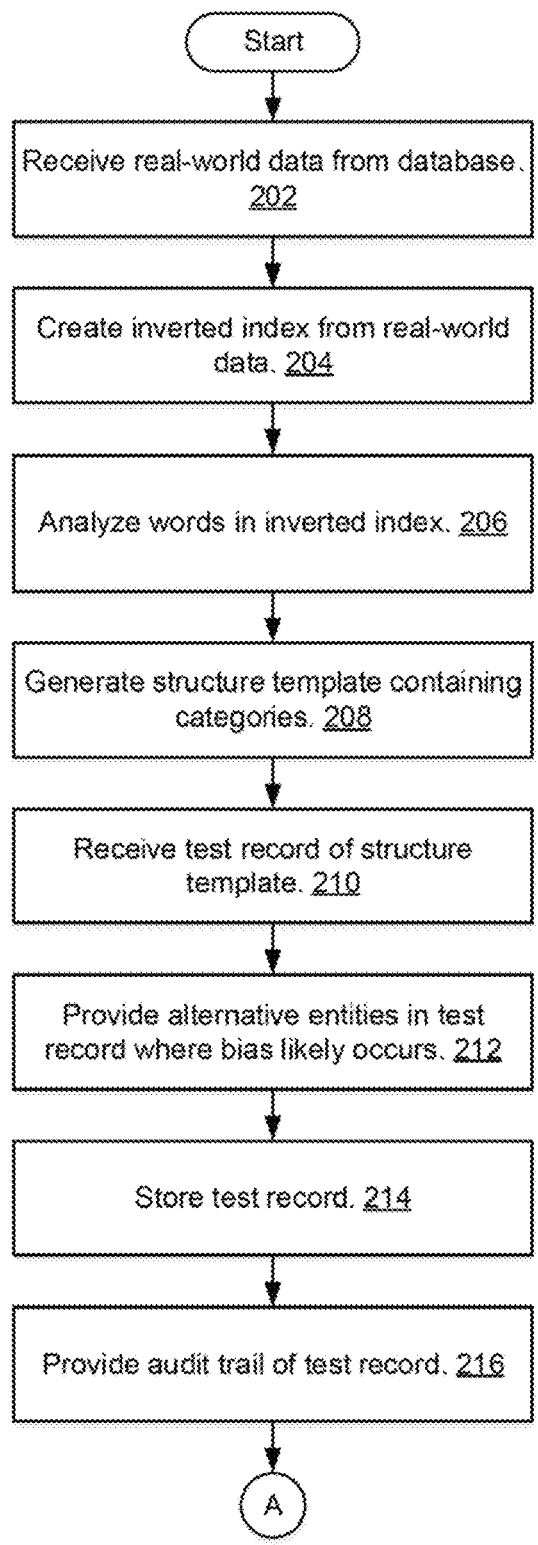
FIG. 2A illustrates an operational flowchart for detecting and mitigating bias in a bias detection and mitigation process according to at least one embodiment.

Referring now to FIG. 2A, an operational flowchart for detecting and mitigating bias in a bias detection and mitigation process 200 is depicted according to at least one embodiment. At 202, the bias mitigation program 110A, 110B receives the real-world data from the database. Using a software program 108 on the user's device, the real-world data may be received by the bias mitigation program 110A, 110B. As used herein, "real-world data" is data that relates to real people. Examples include, but are not limited to, judgments in court cases, census data, credit applications, medical expenditure approvals, and parking and/or speeding tickets. Real-world data may be naturally occurring data, which is data that would have occurred regardless of the role of a researcher. This real-world data may be extrapolated into test data. As used herein, "test data" is data that is fictitious but based on real people and other entities. For example, test data may include data where the first and last name of a person are shuffled or substituted. In essence, the system may use test data so that a specific person is not identified from the real-world data. The test data may be used to evaluate automated systems and formalized manual processes, such as reviewing resumes, skills assessments, allocation of medical resources, automated interviews, as well as automated grading of applications and assignments.

Then, at 204, the bias mitigation program 110A, 110B creates the inverted index. The inverted index may be created from the real-world data. For example, several documents may be retrieved from the database, and words in the documents, such as terms and phrases, may be mapped to a table. The table may be organized in such a way that the table reveals the document or documents in which the words appear. Continuing the example, three documents may be retrieved from the database. Stop words, such as "a," "and," "the," etc., may be removed from the three documents. If the word "best" appears in document two, "best" may be denoted with "2" in the table. If the word "blue" appears in documents one and three, "blue" may be denoted with "1, 3" in the table.

Next, at 206, the bias mitigation program 110A, 110B analyzes words in the inverted index. As described above, the words analyzed include, but are not limited to, terms and phrases in the table of the inverted index. The bias mitigation program 110A, 110B may utilize NLP to analyze words in the inverted index. The analyzation may identify a plurality of categories in the real-world data based on the words in the inverted index. As used herein, "categories" are entities in the real-world data and test data. Categories may include, but are not limited to, first and last names, genders, physical addresses, email addresses, zip codes, telephone numbers, and educational institutions. The plurality of categories may be pre-defined, such as in structured data where each category may be arranged in a row and each column corresponds to the actual representations within that category. For example, "name," "address," and "education" may be arranged in a row. In the "name" column may be a listing of first and last names, such as John Doe, Mary Smith, Bob Johnson, etc. The "address" column may include a list of addresses, such as 21 Main Street, 505 Broad Street, 50 First Avenue, etc. The "education" column may include a list of schools, such as Pennsylvania State University, Stanford University, Boston University, etc. According to at least one other embodiment, a plurality of other categories may be inferred from the real-world data, such as in unstructured data where one or more categories may be latent. For example, news articles and web pages may not have data neatly broken down into individual categories. In such instances, NLP may be utilized to infer these latent categories and add them to the pre-defined categories. Additionally, the bias mitigation program 110A, 110B may identify variations in both the structured and unstructured data. Continuing the example above, John Doe, Mary Smith, and Bob Johnson may be identified as the various names, Pennsylvania State University, Stanford University, and Boston University as the various schools, and 21 Main Street, 505 Broad Street, and 50 First Avenue as the various addresses.

Then, at 208, the bias mitigation program 110A, 110B generates the structure template. The structure template may contain the various entities within each category of the plurality of categories. It may be appreciated that embodiments of the present invention do not use real-world data in generating the structure template. Rather, the test data described above in step 202 may be used in generating the structure template. As described above, test data may include data where the first and last name of a person are shuffled or substituted. Additionally, addresses and educational institutions may be shuffled or substituted. Continuing the example above, where John Doe, Mary Smith, and Bob Johnson are names of actual people, the bias mitigation program 110A, 110B may shuffle the names. In this instance, the names in the test data may be John Smith, Mary Johnson, and Bob Doe. Additionally, the addresses and educational institutions in the real-world data may be shuffled. Continuing the example above, in the real-world data John Doe lives at 21 Main Street in zip code 10001 and he attended Boston University. In the test data this information may be shuffled to become John Smith lives at 505 Broad Street in zip code 10125 and he attended Stanford University. In this manner, the privacy of the subject being tested is preserved since the data cannot be traced back to a specific individual. According to at least one other embodiment, the test data may include data where the first and last name of a person, addresses, and educational institutions are substituted. Substitution may provide an additional layer of privacy protection depending upon the sensitivity of the data. Continuing the example above, in the real-world data John Doe lives at 21 Main Street in zip code 10001 and he attended Boston University. When substituting data, the bias mitigation program 110A, 110B may access reference data as well as natural data from several sources that are distinct from the database where the real-world data was obtained. An example of such a source may be a table of entities from which to substitute the original entity with a masked, i.e., substituted, entity. The table of entities may be obtained, for example, from a dictionary of names, a phone book, a university registry, a medical database, and/or any other source from which entities may be obtained. In the test data, "James Lee" may be substituted for "John Doe," "40 Worth Street in zip code 11791" may be substituted for "21 Main Street in zip code 10001," and "Fordham University" may be substituted for "Boston University." Thus, the structure template may be a resume template where the pre-defined and/or latent categories may be populated into the template. For example, the structure template may be in Extensible Markup Language (XML) format, in which the categories are included in the template in brackets. Continuing the example, "<name>," "<address>," and "<educational institution>" may be populated into the resume template. Once the test data entities themselves within each category are populated into the structure template, a test record of the structure template may be generated which may then be input into the automated systems and formalized processes to detect bias.

Next, at 210, the bias mitigation program 110A, 110B receives the test record of the structure template. As described above in step 208, the test record of the structure template may be generated from the test data. Continuing the above example, in the real-world data John Doe lives at 21 Main Street in zip code 10001 and he attended Boston University. As described above, due to privacy constraints and sensitivity issues, it may be desirable to use test data to detect bias. Thus, upon shuffling the real-world data, the test record may include "John Smith" as the name, "505 Broad Street" as the address, "10125" as the zip code, and "Stanford University" as the educational institution. Additionally, upon substituting the real-world data, the test record may include "James Lee" as the name, "40 Worth Street" as the address, "11791" as the zip code, and "Fordham University" as the educational institution. Using Robotic Process Automation or an application program interface (API), the test record may then be input into the automated systems and formalized manual processes, such as reviewing resumes, skills assessments, allocation of medical resources, automated interviews, as well as automated grading of applications and assignments.

Then, at 212, the bias mitigation program 110A, 110B provides alternative entities in the test record where bias is likely to occur. To ensure that the test data is actually representative of the real-world data, an alternative test record may be input into the automated systems and formalized manual processes described above in step 210. The bias mitigation program 110A, 110B may access historical data, where the historical data indicates previous instances of bias. For example, there may have been a news article written about an advertising company that was caught discriminating based on gender. In such an instance where males were hired at greater rates than females in this advertising company, it may be desirable to vary the entities as much as possible. Continuing the example, a test record of a resume may be generated with a female name and an address, zip code, and educational institution associated with that female. Alternatively, a test record of a resume may be generated with a male name and an address, zip code, and educational institution associated with that male. If the male gets hired by the advertising company a majority of the time, this may indicate that the advertising company's algorithm is biased. In another example, historical data on a pharmaceutical company may be accessed by the bias mitigation program 110A, 110B. It may be known that this particular pharmaceutical company was caught discriminating against certain neighborhoods when it was distributing valuable medications. Continuing the example, a test record of a medical request form may be generated with an applicant and zip code from one side of a city. Alternatively, a test record of a medical request form may be generated with an applicant and zip code from another, more affluent side, of the same city. If the medical request form from the more affluent side of the city routinely gets approved and the medical request form from the less affluent side of the city routinely gets denied, this may indicate that the pharmaceutical company's algorithm is biased against certain individuals from specific zip codes. The above examples are not meant to be limited or exhaustive. One of ordinary skill in the art may envision several other test records that may be evaluated. Thus, the number of test records may be adapted to meet specific needs on an ad hoc or pre-defined basis.

Next, at 214, the bias mitigation program 110A, 110B stores the test record. The test record may be stored according to known methods, such as in one or more physical storage devices described above. In this manner, the test record may be easily accessed by the bias mitigation program 110A, 110B when conducting future evaluations.

Then, at 216, the bias mitigation program 110A, 110B provides an audit trail of the test record. The audit trail may provide tangible proof of an organization's efforts to detect and mitigate bias. It is well known that evidence of bias after the fact may result in negative consequences for an organization, such as regulatory action, adversarial judgments, and/or legal settlements. Additionally, an organization's brand may be diminished. Having tangible proof of efforts to detect and mitigate bias may in turn serve as evidence to independent watchdog groups and organizations themselves that measures were taken to proactively test for bias using test data, and to prevent such bias before it occurs. The audit trail may be test data that is stored without the structure template. The audit trail may be available on demand to a user within the organization so that the user may show the organization complies with applicable laws and regulations. This test data generated from the real-world data may serve as evidence of the dimensions by which bias was evaluated. Storing the test data alone without any structure template may also ensure a lack of duplication in subsequent test data and ensure double blind conditions in which neither the test subjects nor the testers have knowledge of who is being tested.

Figure 2B:
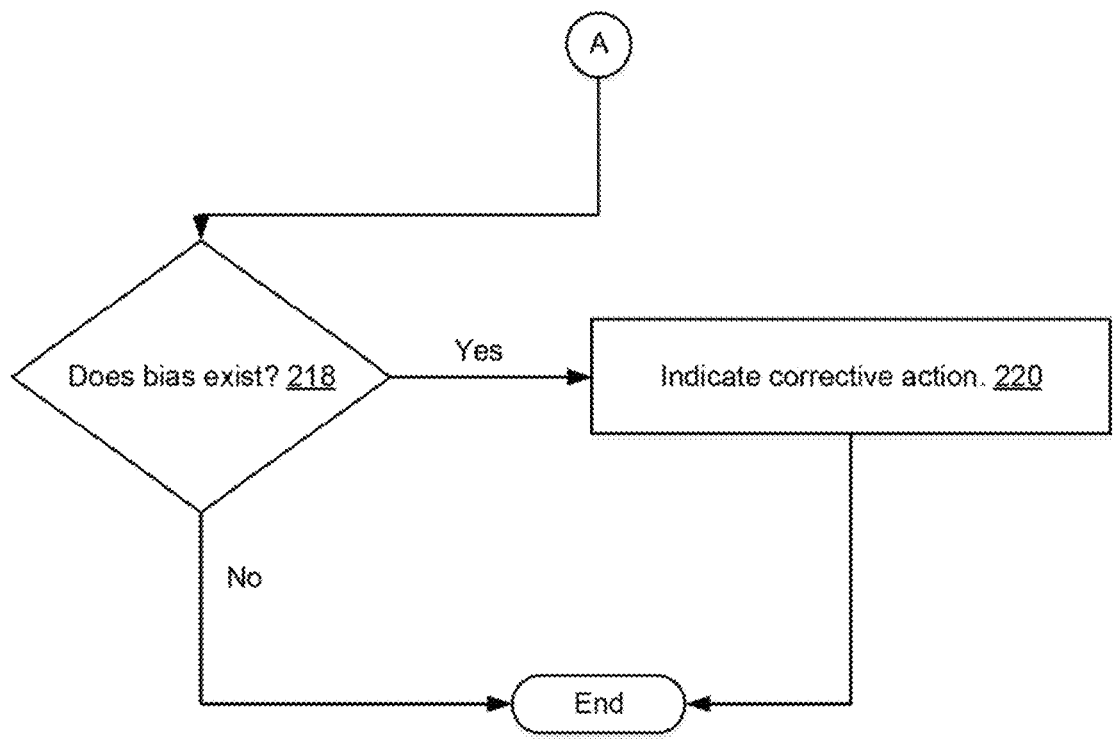
FIG. 2B illustrates a continuation of the operational flowchart depicted in FIG. 2A according to at least one embodiment.

Referring now to FIG. 2B, a continuation of the operational flowchart for detecting and mitigating bias in a bias detection and mitigation process 200 is depicted according to at least one embodiment. At 218, the bias mitigation program 110A, 110B determines whether bias exists. Using an API, the bias mitigation program 110A, 110B may receive output from the automated systems or formalized manual processes and may map to variations in input data, such as the test data and/or real-world data. Using a multiplicity of known bias detection algorithms, such as algorithms in IBM's® Fairness 360 Toolkit (IBM and all IBM-based trademarks and logos are trademarks or registered trademarks of IBM, Inc. and/or its affiliates), the occurrence of bias may be detected. In response to determining bias exists, the bias detection and mitigation process 200 may proceed to step 220 to indicate a corrective action. In response to determining bias does not exist, the bias detection and mitigation process 200 may end.

Then, at 220, the bias mitigation program 110A, 110B indicates a corrective action. Information on a corrective action to take so that bias does not occur again in an automated system or formalized manual process may be displayed to the user via an interface. For example, the indicated corrective action may be to discontinue altogether the use of the bias detection algorithm. In another example, the indicated corrective action may be to modify the bias detection algorithm according to known techniques. Upon completing the corrective action, the bias detection and mitigation process 200 may be repeated as many times as necessary until bias is no longer present in the automated system or formalized manual process.

It may be appreciated that FIGS. 2A and 2B provide only an illustration of one implementation and does not imply any limitations with regard to how different embodiments may be implemented. Many modifications to the depicted environments may be made based on design and implementation requirements.

Figure 3:
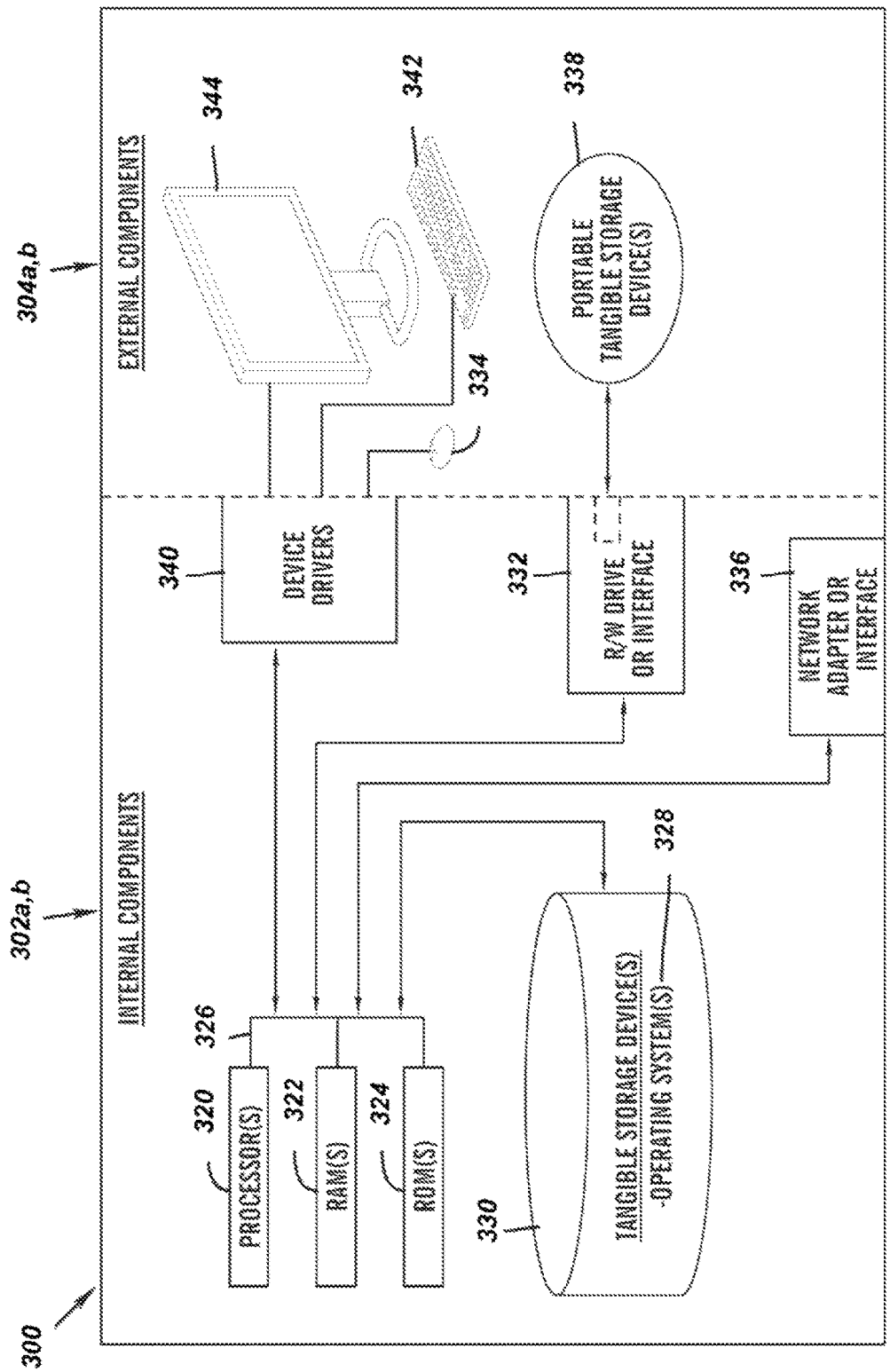
FIG. 3 is a functional block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 *a,b* and external components 304 *a,b* illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the bias mitigation program 110A in the client computing device 102 and the bias mitigation program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 *a,b* also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the bias mitigation program 110A, 110B, can be stored on one or more of the respective portable computer-readable tangible storage devices 338, read via the respective R/W drive or interface 332, and loaded into the respective hard drive 330.

Each set of internal components 302 *a,b* also includes network adapters or interfaces 336 such as a TCP/IP adapter cards, wireless Wi-Fi interface cards, or 3G or 4G wireless interface cards or other wired or wireless communication links. The software program 108 and the bias mitigation program 110A in the client computing device 102 and the bias mitigation program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the bias mitigation program 110A in the client computing device 102 and the bias mitigation program 110B in the server 112 are loaded into the respective hard drive 330. The network may comprise copper wires, optical fibers, wireless transmission, routers, firewalls, switches, gateway computers and/or edge servers.

Each of the sets of external components 304 a,b can include a computer display monitor 344, a keyboard 342, and a computer mouse 334. External components 304 a,b can also include touch screens, virtual keyboards, touch pads, pointing devices, and other human interface devices. Each of the sets of internal components 302 a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
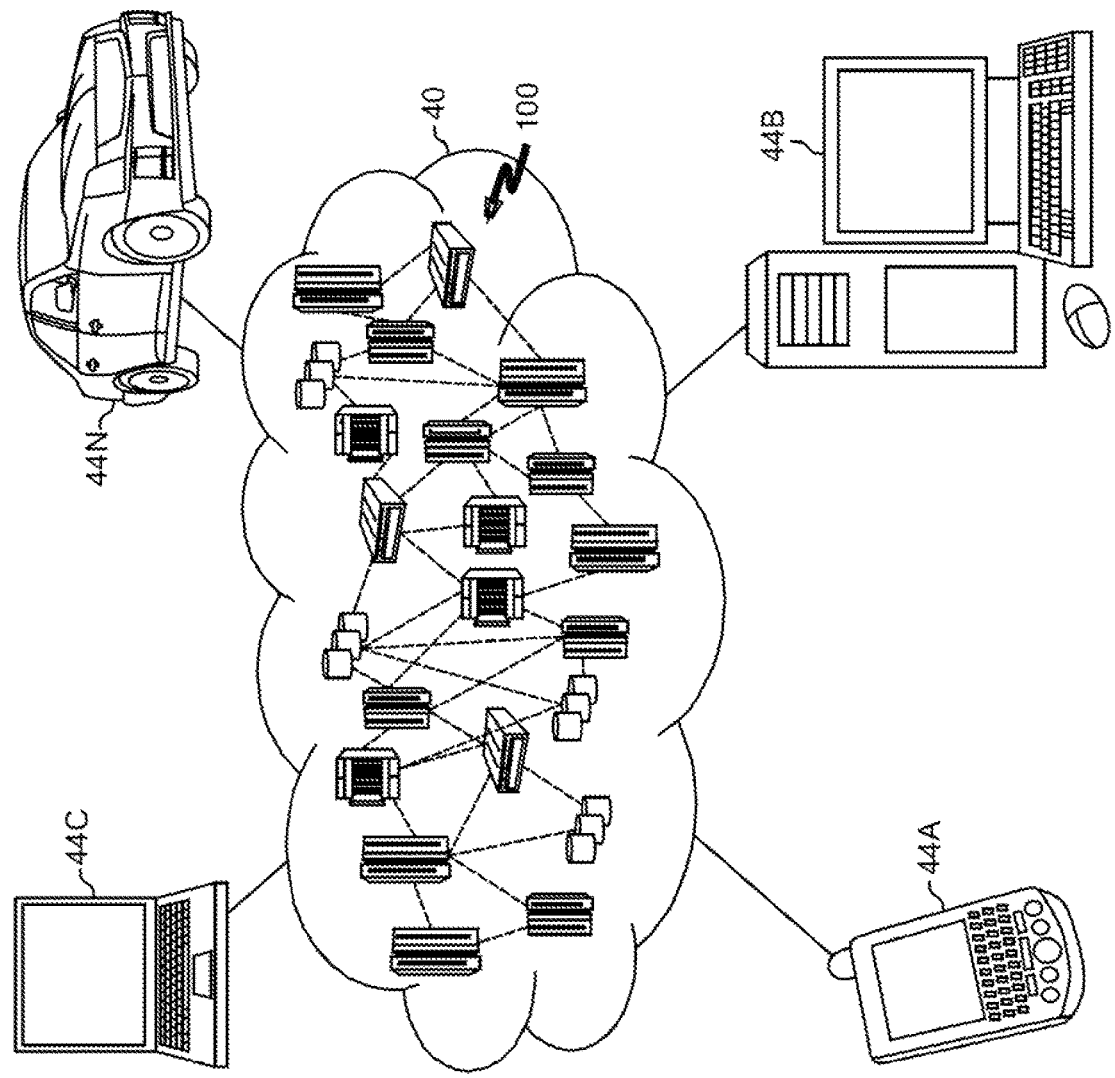
FIG. 4 depicts a cloud computing environment according to an embodiment of the present invention.

Referring now to FIG. 4, illustrative cloud computing environment 40 is depicted. As shown, cloud computing environment 40 comprises one or more cloud computing nodes 100 with which local computing devices used by cloud consumers, such as, for example, personal digital assistant (PDA) or cellular telephone 44A, desktop computer 44B, laptop computer 44C, and/or automobile computer system 44N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 40 to offer infrastructure, platforms and/or software as services for which a cloud consumer does not need to maintain resources on a local computing device. It is understood that the types of computing devices 44A-N shown in FIG. 4 are intended to be illustrative only and that computing nodes 100 and cloud computing environment 40 can communicate with any type of computerized device over any type of network and/or network addressable connection (e.g., using a web browser).

Figure 5:
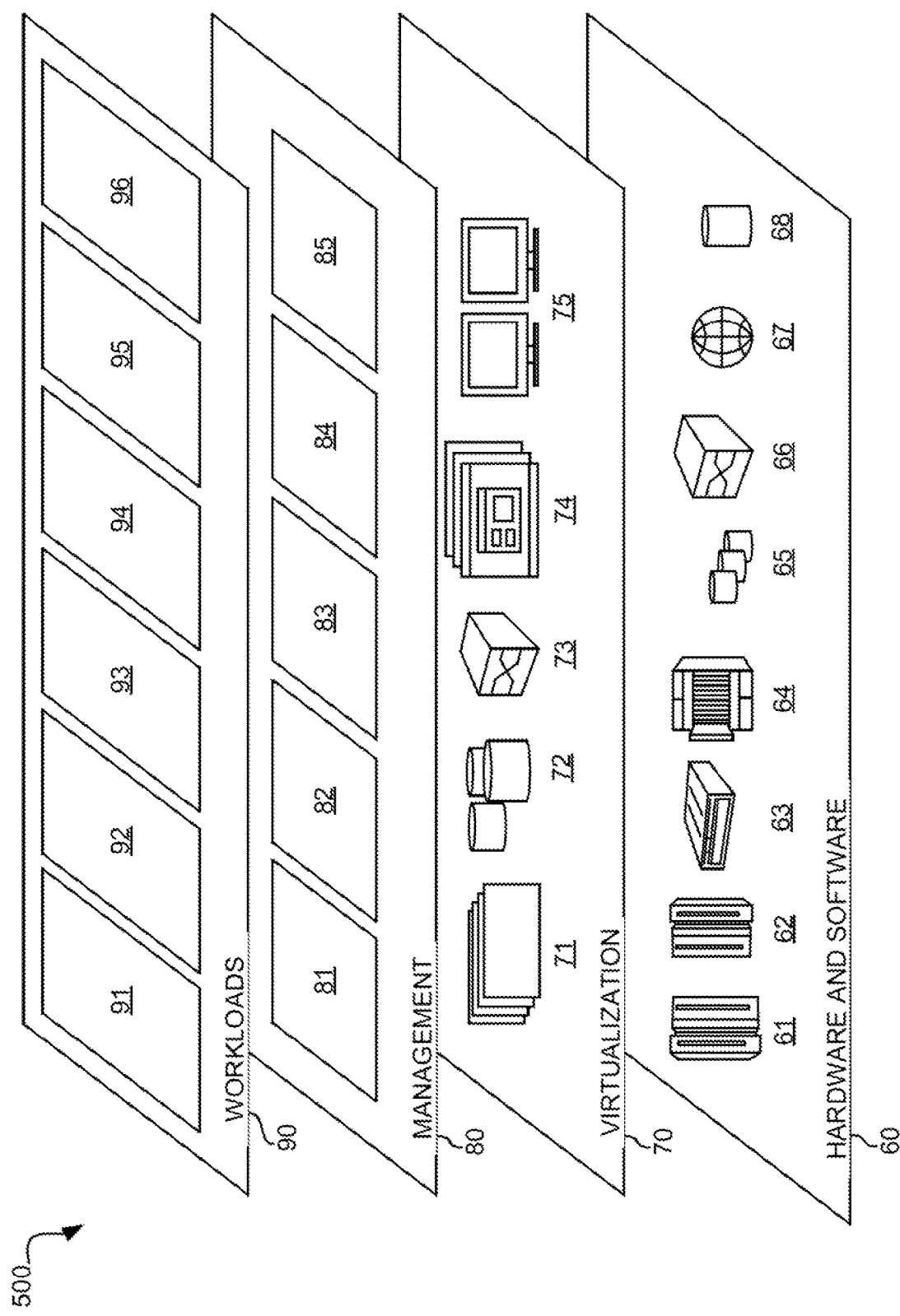
FIG. 5 depicts abstraction model layers according to an embodiment of the present invention.

Referring now to FIG. 5, a set of functional abstraction layers 500 provided by cloud computing environment 40 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and bias detection and mitigation 96. Bias detection and mitigation 96 may relate to deriving variations in data in order to determine whether bias exists in automated systems or formalized processes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of detecting and mitigating bias, the method comprising:
receiving real-world data from a database;
creating an inverted index from the real-world data;
analyzing words in the inverted index, wherein the analyzation identifies a plurality of categories in the real-world data;
generating a structure template containing various entities within each category of the plurality of categories;
receiving a test record of the structure template;
providing alternative entities in the test record where bias is likely to occur;
storing the test record;
providing an audit trail of the test record; and
in response to determining bias exists, indicating a corrective action.

2. The method of claim 1, wherein the analyzation infers a plurality of other categories from the real-world data.

3. The method of claim 1, wherein the words in the inverted index are selected from a group consisting of terms, and phrases.

4. The method of claim 1, wherein the categories are selected from a group consisting of names, addresses, genders, email addresses, zip codes, telephone numbers, and educational institutions.

5. The method of claim 1, wherein the test record is generated from test data.

6. The method of claim 1, wherein the corrective action is selected from a group consisting of discontinuing an algorithm, and modifying an algorithm.

7. A computer system, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving real-world data from a database;
creating an inverted index from the real-world data;
analyzing words in the inverted index, wherein the analyzation identifies a plurality of categories in the real-world data;
generating a structure template containing various entities within each category of the plurality of categories;
receiving a test record of the structure template;
providing alternative entities in the test record where bias is likely to occur;
storing the test record;
providing an audit trail of the test record; and
in response to determining bias exists, indicating a corrective action.

8. The computer system of claim 7, wherein the analyzation infers a plurality of other categories from the real-world data.

9. The computer system of claim 7, wherein the words in the inverted index are selected from a group consisting of terms, and phrases.

10. The computer system of claim 7, wherein the categories are selected from a group consisting of names, addresses, genders, email addresses, zip codes, telephone numbers, and educational institutions.

11. The computer system of claim 7, wherein the test record is generated from test data.

12. The computer system of claim 7, wherein the corrective action is selected from a group consisting of discontinuing an algorithm, and modifying an algorithm.

13. A computer program product, the computer program product comprising:
- one or more computer-readable tangible storage medium and program instructions stored on at least one of the one or more tangible storage medium, the program instructions executable by a processor capable of performing a method, the method comprising:
- receiving real-world data from a database;
- creating an inverted index from the real-world data;
- analyzing words in the inverted index, wherein the analyzation identifies a plurality of categories in the real-world data;
- generating a structure template containing various entities within each category of the plurality of categories;
- receiving a test record of the structure template;
- providing alternative entities in the test record where bias is likely to occur;
- storing the test record;
- providing an audit trail of the test record; and
- in response to determining bias exists, indicating a corrective action.

14. The computer program product of claim 13, wherein the analyzation infers a plurality of other categories from the real-world data.

15. The computer program product of claim 13, wherein the words in the inverted index are selected from a group consisting of terms, and phrases.

16. The computer program product of claim 13, wherein the categories are selected from a group consisting of names, addresses, genders, email addresses, zip codes, telephone numbers, and educational institutions.

17. The computer program product of claim 13, wherein the test record is generated from test data.

\* \* \* \* \*